United States Patent [19]

Kennedy et al.

[11] Patent Number: 4,836,492
[45] Date of Patent: Jun. 6, 1989

[54] KNITTING MACHINE STAND

[76] Inventors: Kurtis R. Kennedy, 1134 West Vailwood Dr., Murray, Utah 84123; Lee R. Childs, 873 South 400 West, Bountiful, Utah 84010

[21] Appl. No.: 148,346

[22] Filed: Jan. 25, 1988

[51] Int. Cl.⁴ .............................................. F16M 1/00
[52] U.S. Cl. ...................................... 248/676; 108/9; 248/165
[58] Field of Search ............... 248/676, 666, 667, 397, 248/165; 112/217.1; 66/1 R; 108/6, 9

[56] References Cited

U.S. PATENT DOCUMENTS

| | | | |
|---|---|---|---|
| 1,747,951 | 2/1930 | Reichert | 248/165 X |
| 1,862,618 | 6/1932 | Fehn | 248/131 X |
| 2,521,355 | 9/1950 | Ford | 248/165 X |
| 3,150,615 | 9/1964 | Beijer | 108/9 |
| 3,492,952 | 2/1970 | Yourist | 108/9 |
| 4,033,537 | 7/1977 | Pridham | |
| 4,550,666 | 11/1985 | Svoboda | 108/9 X |
| 4,705,438 | 11/1987 | Zimmerman | 108/9 X |

Primary Examiner—J. Franklin Foss
Attorney, Agent, or Firm—Mallinckrodt & Mallinckrodt

[57] ABSTRACT

A stand for a knitting machine provides for easily moving the machine from a first knitting position to a second knitting position by tilting the machine relative to the stand. The second knitting position is adjustably set by the user of the knitting machine. A tilt locking mechanism is mounted to lock the position of the machine relative to the stand in the first position, the second position, or any position in-between. The legs of the stand are removable for storage and transportation of the stand and storage trays may be mounted on the legs.

14 Claims, 3 Drawing Sheets

KNITTING MACHINE STAND

BACKGROUND OF THE INVENTION

1. Field

The invention is in the field of knitting machine stands which provide a support for a knitting machine and are adapted to provide a tilt of the knitting machine to different operating positions.

2. State of the Art

In the normal use of a knitting machine, the machine is placed on a flat surface with its working surface horizontal and flat knitting is done on the machine. In many instances, a ribbing attachment is added to the knitting machine so that ribbed knitting for collars, sleeves, etc. can be done. In such instance it is normal for the ribbing attachment and the knitting machine to come together and be joined at an angle and to be secured to a flat table by special brackets so that the ribbing attachment is at an angle to the user. In such position, however, the knitting machine is held at an angle facing away from the user. Thus, in normal cases, the ribbing attachment must be separated from the knitting machine after ribbing has been done so that the knitting machine can be returned to its horizontal position.

U.S. Pat. No. 4,033,537 discloses a knitting machine stand which allows a knitting machine mounted thereon to be tilted between two extremes of tilt, and to be secured in a tilted position at any point between the two extremes. However, to secure the machine in a titled position between the two extremes, the machine must be moved to the desired position and held manually in that position by the user while at the same time the user or a helper tightens set screws to thereby hold the machine at the desired degree of tilt. This procedure must be followed every time the machine is moved between its flat knitting position and its ribbing position. This is difficult and time consuming and it is hard to get the machine back into the same desired intermediate position each time.

It would be advantageous to provide a knitting machine stand wherein the range of tilt, and the two knitting positions, could be adjustably set by the user so he could easily move between the two knitting positions as many times as desired and the positions would always be the same.

SUMMARY OF THE INVENTION

According to the invention, a knitting machine stand has an elongate, horizontal supporting member supported above the floor by a set of legs. An elongate, flat table top adapted to receive a knitting machine thereon is pivotally mounted about a longitudinal horizontal axis on and above the supporting member. A tiltlock mechanism is provided for allowing the table top to be tilted from a first, flat knitting position to a second, tilted knitting position and to be locked in either of its extreme knitting operation positions or in any tilt position between the first and second knitting positions. Means is provided for operator adjustment of the maximum amount of tilt of the table top, i.e. the location of the second knitting position, so that it can be set as desired by the user. Thus, the user can easily move the table top and knitting machine between the first, flat position, and the maximum tilt, i.e. the desired second knitting position, and does not have to hold and tighten the machine into intermediate tilt position each time the tilt position is required. Additionally, the legs of the stand are detachable to facilitate storage and transportation of the stand, and storage trays are mounted on the legs to provide storage for knitting supplies.

THE DRAWINGS

In the accompanying drawings, which illustrate the best mode presently contemplated for carrying out the invention:

FIG. 1 is a front elevation showing the stand with the table top in a horizontal position;

FIG. 2, a fragmentary vertical section taken on the line 2—2 of FIG. 1 with the table top in a horizontal position;

FIG. 3, a fragmentary rear elevation of the stand of FIG. 1 with the table top in a forward tilted position and drawn to a larger scale;

FIG. 4, a fragmentary vertical section taken on the line 4—4 of FIG. 3 showing the table in tilted position in solid lines and in horizontal position in broken lines;

FIG. 5, an exploded view showing the method of attaching the legs to the supporting member; and FIG. 6, an exploded view showing the underside of the table top and its attachment to the rest of the stand.

DETAILED DESCRIPTION OF THE PREFERRED EMBODIMENT

Figure 1:
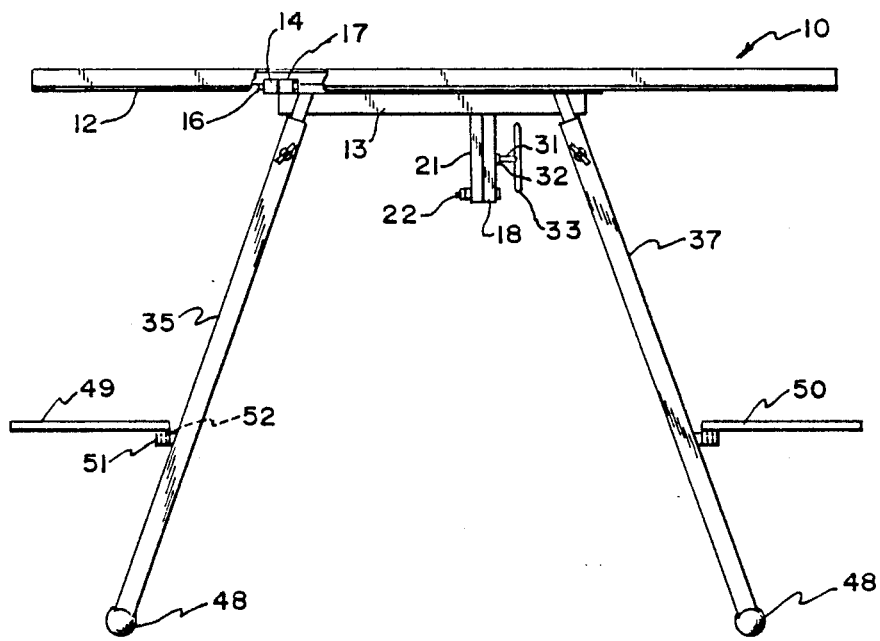

As shown in FIGS. 1-4 and 6, the device of the invention has a flat, elongated table top 10 adapted to have a knitting machine (not shown) attached thereto. Table top 10 preferably includes a surface plate 11 with side flanges 11a and 11b along the longitudinal sides thereof. A box beam 12 is secured, such as by welding, to the bottom side of the surface plate 11 along the front longitudinal edge thereof to provide a means against which the normal clamps of a knitting machine may be secured. The table top 10 is pivotally mounted on a horizontal supporting member 13 by means of a pair of sleeves 14 secured to the underside of table top cross members 15 which receive the end of pivot pins 16 which extend from sleeves 17 mounted at the respective ends of supporting member 13. Pins 16 may conveniently be bolts, as shown, inserted through respective sleeves 17 and 14 and secured in place such as by welding bolt heads 16a to sleeve 17. The central bores in sleeves 14 and 17 are slightly larger than the diameter of bolts 16 so the bolts pass freely therethrough. In this way, table top 10 can freely rotate about pivot pins 16.

A tilt locking mechanism comprises a slideway 18, which is a hollow, elongate, tubular channel having a square cross section and which is essentially vertically disposed; a slide 19 which is a solid post having a square cross section which slides easily but snugly in the slideway 18; a pivoting attachment 20 wherein the slide 19 is pivotally attached to the underside of table top 10 as described later; a second vertically disposed and depending member 21 which is juxtaposed to the slideway 18, and which is a hollow, elongate, tubular channel having a square cross section, and which is welded at its upper end to the horizontal supporting member 13; and a pivot pin 22 which passes through aligned holes in the lower ends of members 18 and 21 and whose one end is threaded and whose other end is headed, and wherein two nuts 23 and 24 are threaded onto the threaded end wherein nut 23 is brought into close conjunction with member 21 but is not tightened against it, and wherein nut 24 is tightened against nut 23, thus providing a jamb nut arrangement.

The pivoting attachment 20 comprises a U shaped bracket 25 welded to the underside of table top 10, and a pivot pin 26 which passes through aligned holes in the legs of the bracket and in the slide 19. One end of pin 26 is headed and the other end is threaded, wherein the threaded end is threaded into engaging threads in one leg of the bracket 25. These threads may be conveniently provided by a nut 25a, FIG. 3, secured, such as by welding, to a leg of bracket 25.

As can be readily seen from this arrangement (see FIGS. 2 and 3), as the table top 10 is tilted, slide 29 slides in the slideway 18, at the same time pivoting at its upper end about pivot pin 26, and at the same time slideway 18 pivots at its lower end about the pivot pin 22. When the table top 10 is in a substantially horizontal position, slide 19 is substantially fully inserted into slideway 18 and slideway 18 is in an outwardly slanting position. When the table top 10 is tilted forwardly towards the operator, FIGS. 3 and 4, slide 19 partially withdraws from slideway 18 and slideway 18 pivots about pivot pin 22 towards a more nearly vertical position.

Figure 2:
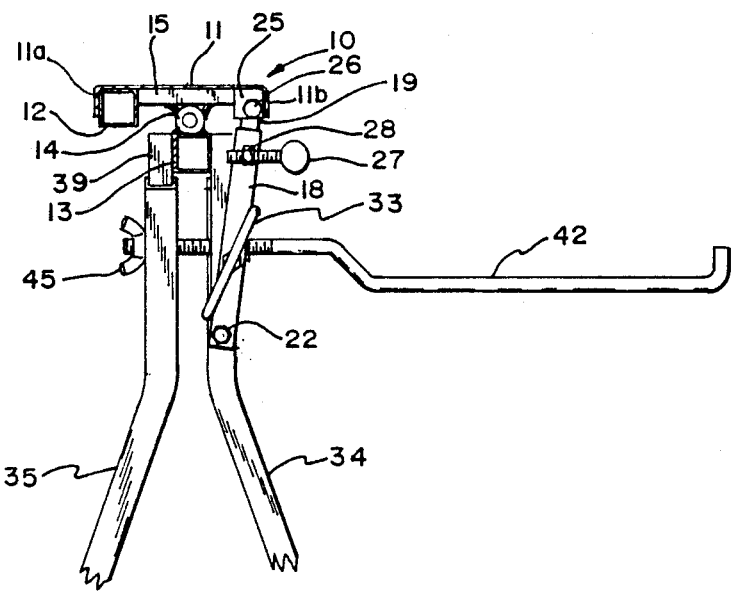

As shown in FIG. 2, tilting of the table top 10 away from the operator and towards the horizontal position is stopped when slide 19 is fully inserted into slideway 18, thus establishing a first knitting position.

Figure 4:
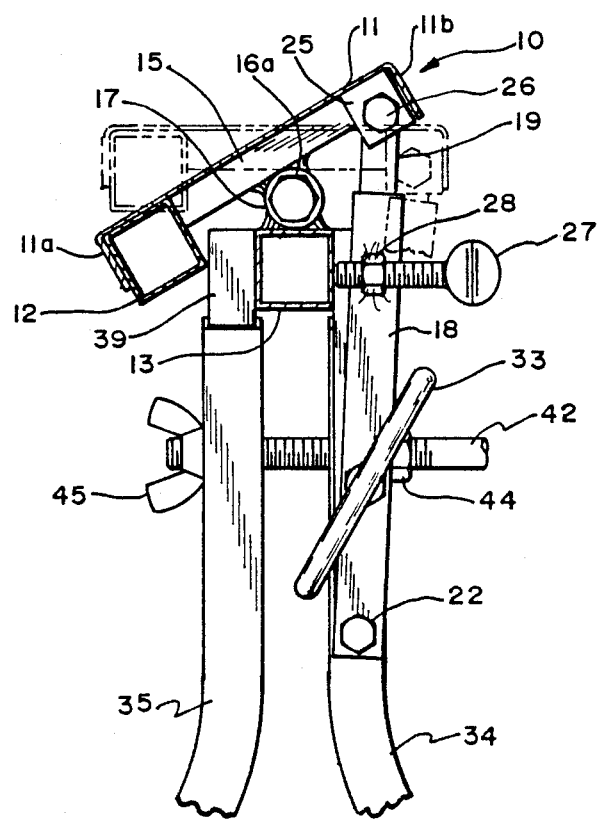

Also, as shown in FIGS. 2 and 4, a set screw 27 is threaded into a boss 28, which is welded to the side of slideway 18. As is obvious from FIG. 2, tilting of the table top 10 toward the operator will be stopped when the tip of the set screw 27 abuts against the supporting member 13, thus establishing a second knitting position. This second knitting position, and thus a range of tilt, is adjustable by the operator up to a maximum possible, by turning set screw 27, which is fashioned with a wing tip at one end to facilitate the adjustment by the fingers of the operator.

It can be seen from FIG. 4 that the maximum possible degree of tilt, or the provision of a maximum possible range of tilt, occurs when the corner of box beam 12 abuts a leg mounting member 39 as the table top is tilted, and when set screw 27 is withdrawn. In this preferred embodiment, the spacing from the sleeves 14 to the corner of box beam 12 is arranged to be such that the corner of box beam 12 abuts a leg mounting member 39, as the table top 10 is tilted, just before slideway 18 abuts supporting member 13. Thus, this requirement establishes a minimum dimension from sleeve 14 to the corner of box beam 12, and a minimum horizontal dimension from pivot pin 26 to sleeve 14, in order to accommodate a desired maximum possible tilted second knitting position. These factors thereby also largely establish the minimum width of table top 10.

Figure 3:
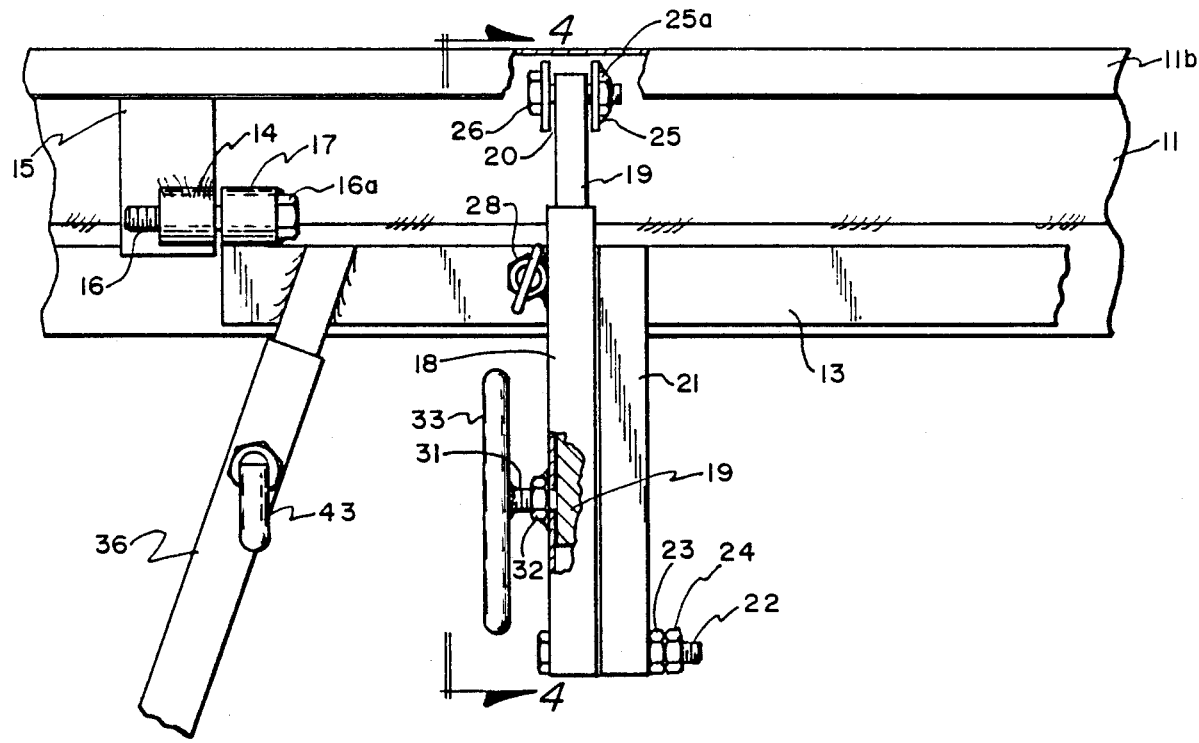

As can be seen in FIG. 3, the tilt of table top 10 can be locked in place at either the first knitting position, the second knitting position, or any position inbetween. This is accomplished by set screw 31 which is threaded into nut 32 secured, such as by welding, to slideway 18, and which protrudes through a hole in slideway 18 so that it can be tightened firmly against slide 19 in slideway 18. This provides a cooperative means for preventing relative movement of the slide and slideway. Set screw 31 is also equipped with a handle 33 to facilitate secure and easy locking, or unlocking, of the table top in a knitting position by an operator without the use of tools.

Figure 5:
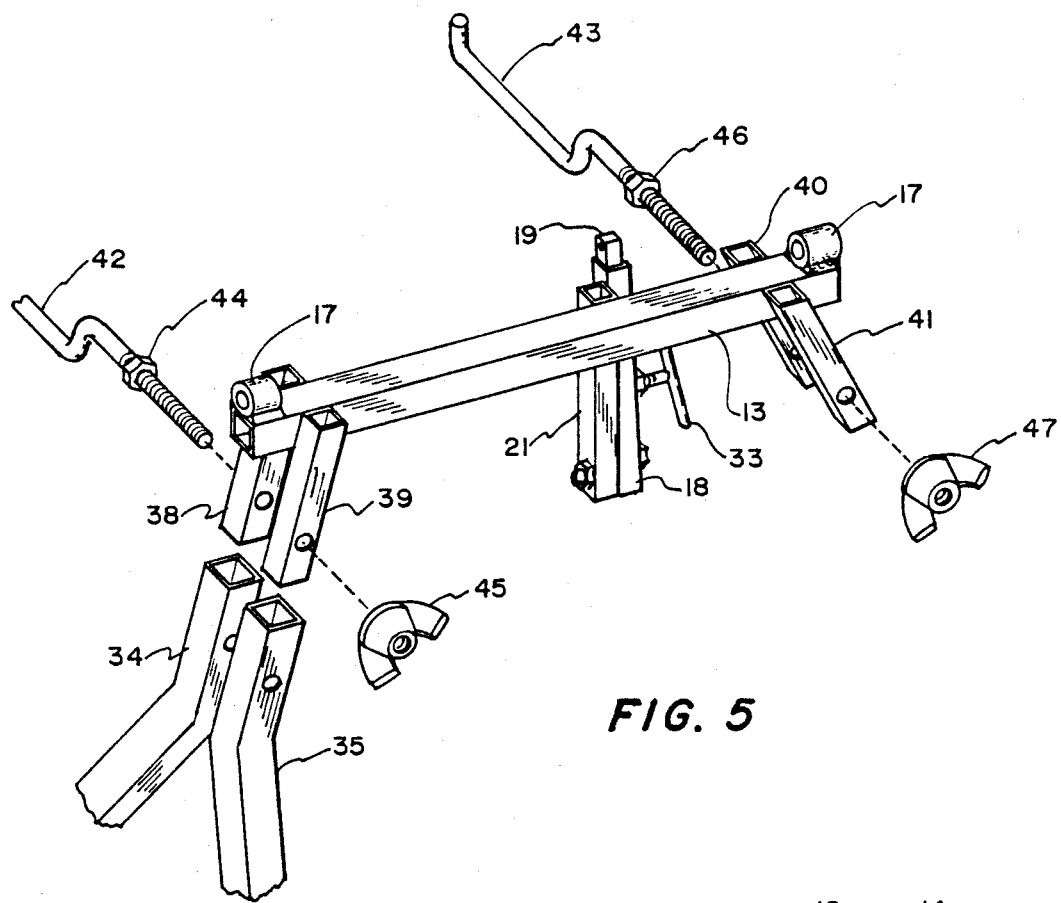
Figure 6:
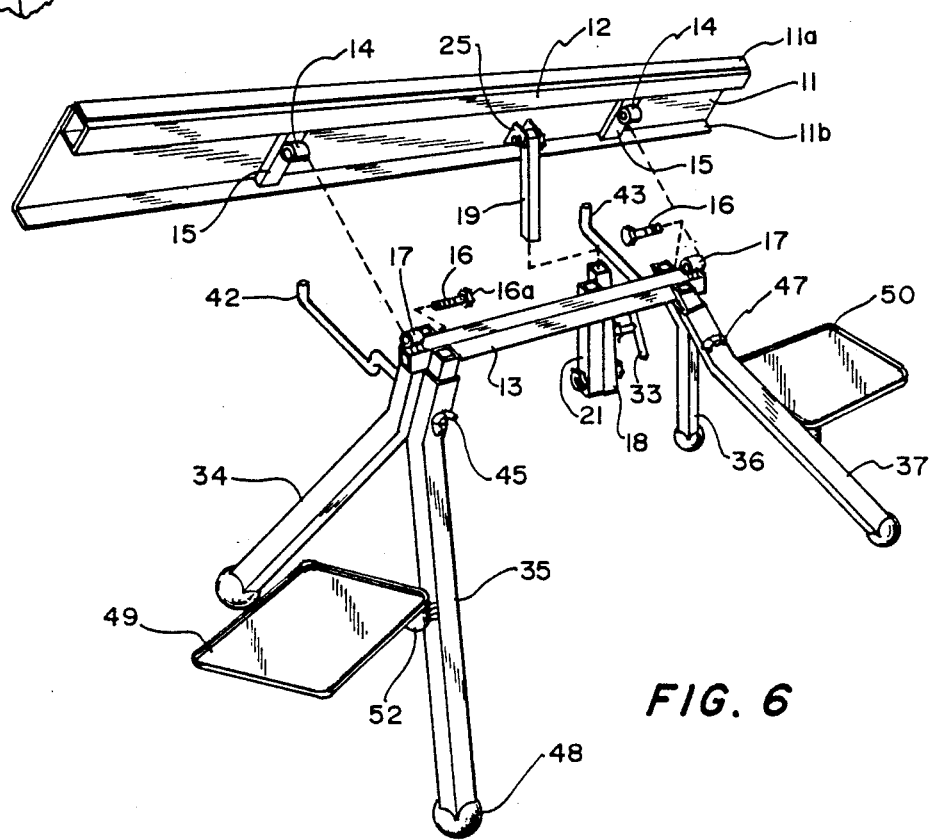

In this preferred embodiment, the knitting machine stand has a set of legs for supporting the supporting member 13. As shown in FIGS. 5 and 6, there are four legs, 34, 35, 36, and 37. Each of these legs is formed from elongate tubular channel having a square cross section. The legs are arranged in pairs at each end of the supporting member. The pair of legs towards the left end slopes downwardly and towards the left, whereas the pair of legs towards the right end slopes downwardly and towards the right. In addition, each leg of a pair, throughout the major part of its length, bends away from its pair member. Thus, the result is to provide a wide separation of the leg ends resting on the floor, both longitudinally and transversely, thus providing great stability for the knitting machine, and also minimizing the possibility of the legs becoming entangled with the knitting product. Each leg also has a rubber foot, such as 48, on its bottom end.

In addition, each leg is detachably attached, at its upper end, to a mounting member, such as 38, 39, 40, or 41. As an example, leg 35 slides over mounting member 39, which is an elongate steel tubular section having a square cross section, sized so as it fit snugly, but not tightly, into leg 35, and which is welded to supporting member 11 at an angle, as shown.

Each pair of legs is fastened to its mounting members by means of a threaded rod, such as 42, which passes through aligned holes in the mounting members 38 and 39 and at the same time, through aligned holes in the legs 34 and 35. Likewise rod 43 passes through aligned holes in mounting members 40 and 41 and legs 36 and 37.

Rod 42 is threaded at one end for a length sufficient to extend through legs 34 and 35 and also accommodate a nut 44 on the outside of leg 34 and another nut 45 on the outside of leg 35. Nut 45 is a wing nut so as to facilitate easy tightening or removal by the fingers. Likewise, rod 43 is threaded and carries two nuts 46 and 47, 47 being a wing nut. Thus, the legs can be detached, for easy transportation or storage, without the use of tools.

In addition, in this preferred embodiment, each of the rods 42 and 43 is bent downwardly, then horizontally and then upwardly at its extreme end, thus cooperating to provide shelf receiving and supporting brackets. A shelf may be placed thereon to hold the knitting yarns and knitting implements. Alternatively, the brackets may be used to support the cover of the knitting machine.

In addition, as shown in FIGS. 1 and 6, two shelves, 49 and 50, are provided. Shelf 49 is pivotally supported on a vertical axis, and attached to leg 35, and shelf 50 likewise to leg 37.

The pivotal support for each shelf consists of a boss, such as 51, which is welded to leg 35 and has a hole extending vertically through it, which receives a pin 52, which is welded to the underside, at a corner, of shelf 49. Shelf 50 is likewise mounted to leg 37. Thus, each shelf can pivot about its corner with easy access by the operator. These shelves provide convenient places for the operator to store various implements and tools used in the knitting process.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A stand for a knitting machine, comprising an elongate, substantially horizontal, supporting member; a set of legs adapted to be attached to said supporting member to support it above the surface upon which the stand rests; and elongate table top pivotally mounted on said supporting member for movement about an axis extending longitudinally of said member and between a first knitting position and a second knitting position, said table top having a substantially flat upper surface and a width wider than the supporting member and being adapted to receive and support a knitting machine, said table top including a clamp receiving means along its front longitudinal edge about which clamps on a knitting machine may be secured and wherein the distance from the clamp receiving means to the axis where the table top is pivotally mounted on the supporting member establishes a maximum possible range of tilt for said table top by means of abutment of the clamp receiving means against some portion of the stand when said table top is tilted; cooperative means between said supporting member and said table top for establishing said first knitting position; means for adjustably presetting the second knitting position by the user; and means for locking said table top in any desired position of tilt between said first and second knitting positions.

2. A stand according to claim 1, wherein the clamp receiving means is a lengthwise-running box beam attached along the front longitudinal edge of the table top.

3. A stand according to claim 1, wherein the adjustable means for presetting the second knitting position is a set screw having an end adapted to abut against the supporting member.

4. A stand according to claim 3, wherein the set screw has a means for secure and easy grasping by the fingers of an operator so as to facilitate presetting.

5. A stand according to claim 1, wherein the cooperative means for establishing the one knitting position of said table top comprises a slide and slideway, one attached to and depending from the table top and the other depending from and supported by said supporting member.

6. A stand according to claim 5, wherein the slideway is vertically disposed and is juxtaposed to a second vertically disposed and depending member, which second member is fastened at its upper end to said supporting member, and wherein said slideway is pivotally attached at its lower end portion to the lower end portion of said second member, and wherein the slide is pivotally attached to said table top and is slidably engaged with the slideway, the means for locking the table top in any desired position of tilt being associated with the cooperative means for preventing relative movement of the components thereof.

7. A stand according to claim 6, wherein the means for locking the table top in any desired position of tilt comprises a set screw threaded in the slideway and adapted to bear against and hold the slide from moving.

8. A stand according to claim 7, wherein the set screw has a means for secure and easy grasping by the fingers of an operator so as to facilitate locking of the table top.

9. A stand according to claim 1, wherein the set of legs comprises two pairs of legs, wherein the pairs of legs slope away from each other longitudinally of the table top and the legs of each pair are bent so as to slope away from each other transversely of the table top.

10. A stand according to claim 1, wherein each leg of the set of legs is detachably attached to the supporting member by a mounting member fastened to and depending from the supporting member and slidably engaged by said leg.

11. A stand according to claim 10, wherein pairs of legs are fastened to the respective mounting members, the legs of each pair being at opposite sides of the mounting members and held in place by a threaded rod passed through aligned holes in said legs and in the mounting members, respectively, and by nuts threaded on opposite end portions of said rod.

12. A stand according to claim 11, wherein at least one of said nuts is a wing nut for facilitating loosening or tightening by an operator without the use of tools.

13. A stand according to claim 11, wherein the threaded rods extend backwardly of the table top as shelf receiving and supporting brackets.

14. A stand according to claim 1, wherein at least one of the legs of the set of legs is provided intermediate its length with means for pivotally receiving and supporting on a vertical axis a shelf for swinging from one horizontal position to another.

* * * * *